United States Patent [19]

Lupo

[11] Patent Number: 4,684,168
[45] Date of Patent: Aug. 4, 1987

[54] SUN ROOF FOR VEHICLES

[75] Inventor: Elio Lupo, Turin, Italy

[73] Assignee: Gilardini S.p.A., Turin, Italy

[21] Appl. No.: 750,692

[22] Filed: Jun. 28, 1985

[30] Foreign Application Priority Data

Apr. 15, 1985 [IT] Italy .............................. 53228/85[U]

[51] Int. Cl.4 .......................... B60J 7/22; B60J 7/053; B60J 7/057
[52] U.S. Cl. .................................... 296/217; 296/222; 296/223
[58] Field of Search ............... 296/216, 217, 222, 223, 296/224; 98/2.14

[56] References Cited

U.S. PATENT DOCUMENTS

| 4,005,901 | 2/1977 | Lutke et al. | 296/218 |
| 4,291,912 | 9/1981 | Fox et al. | 296/217 |
| 4,332,416 | 1/1982 | Lutz et al. | 296/217 |

FOREIGN PATENT DOCUMENTS

| 1262135 | 2/1968 | Fed. Rep. of Germany | 296/217 |
| 1946161 | 3/1971 | Fed. Rep. of Germany | 296/222 |
| 3012538 | 10/1981 | Fed. Rep. of Germany | 296/217 |
| 382781 | 11/1932 | United Kingdom | 296/217 |

Primary Examiner—Robert B. Reeves
Assistant Examiner—Dennis H. Pedder
Attorney, Agent, or Firm—Michael N. Meller

[57] ABSTRACT

A sun roof for vehicles, comprising a main part slidable beneath the roof panel to open or close an aperture, and a front part tiltable upwardly to impede direct entry of air into the front zone of this aperture. The front part is disposed in the closure position substantially at the same height as the main part. A single control cable at a lateral side of the sun roof actuates a slidable control body which engages the front part through a slidable auxiliary body. The control body is connected to the main part through a lost motion connection to allow the main part to remain stationary while the front part is being tilted.

11 Claims, 8 Drawing Figures

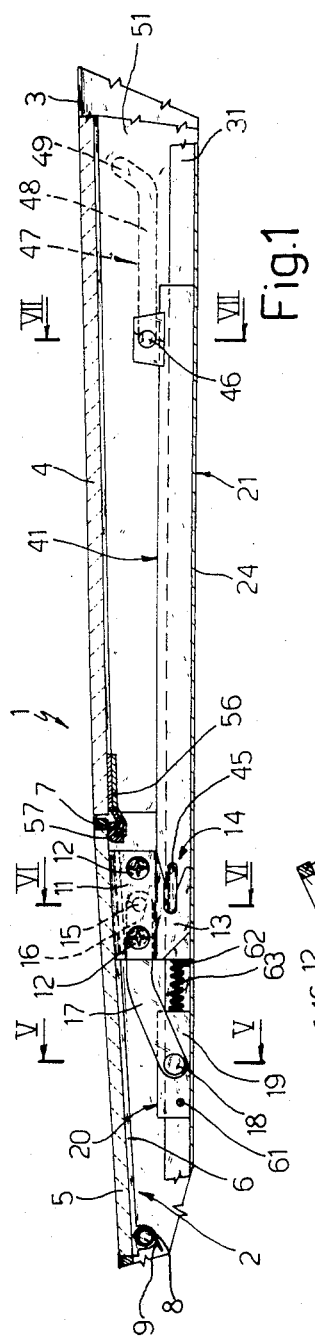

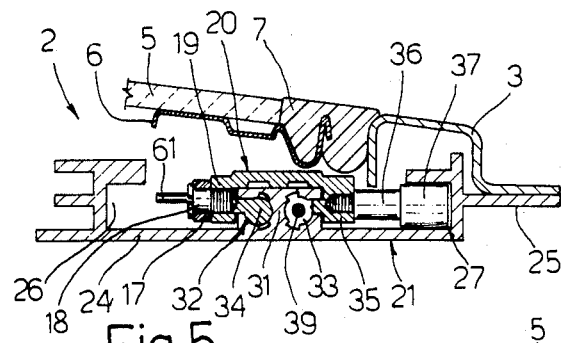
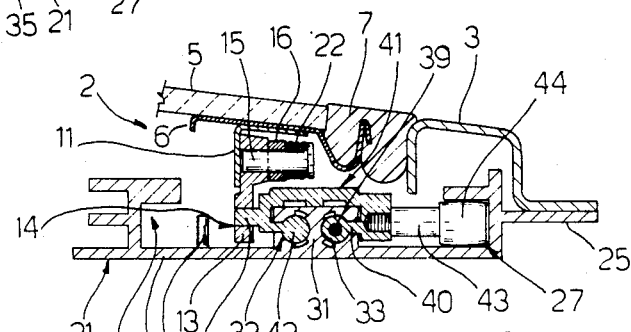
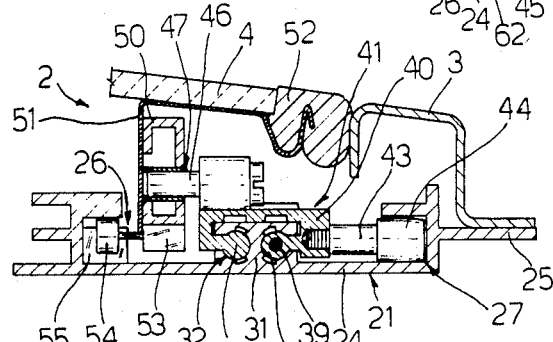
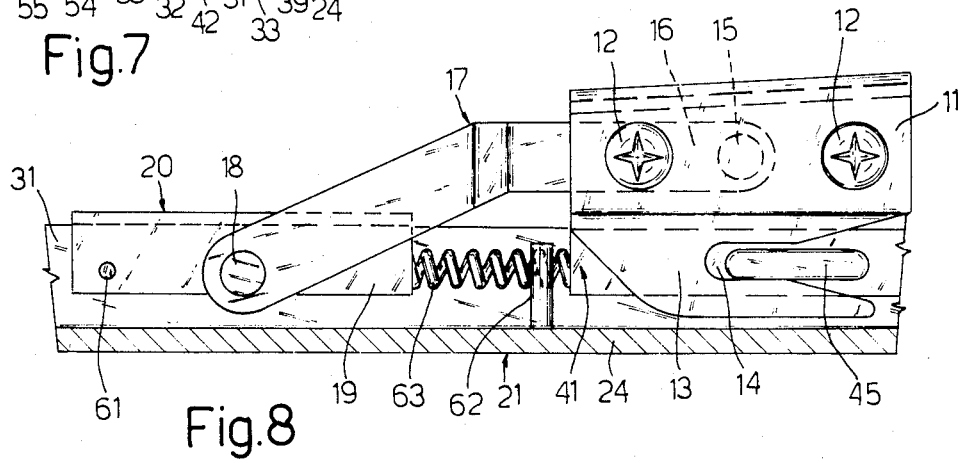

SUN ROOF FOR VEHICLES

BACKGROUND OF THE INVENTION

The present invention relates to a sun roof for vehicles, in particular motor vehicles.

As is known, there are various sun roofs in which a slidable part is manually displaced or electrically controlled to open the aperture in the roof to a greater or lesser extent. To avoid direct entry of air into the front zone of this aperture, which would be rather uncomfortable for the occupants of the vehicle, there are provided various arrangements among which is that of providing a fixed or movable tilted front part. This known solution has, however, still several disadvantages since a fixed deflector in the front zone of the aperture in the roof has evident aerodynamic and aesthetic disadvantages, whilst a movable deflector either has to be formed partially housed within the interior of the roof, which limits the screening effectiveness and has evident disadvantages of limiting the useful height within the vehicle, or else has to be formed with an operating mechanism which is complicated and independent from that which actuates the main part, and with the necessity of utilising two control cables for actuating the tiltable deflector and the slidable main part with consequent associated disadvantages.

SUMMARY OF THE INVENTION

The object of the present invention is that of providing a sun roof for vehicles which overcomes the above listed disadvantages, that is, one which allows effective screening of the direct entry of air from the front zone of the aperture with a relatively simple and therefore economic construction and of small size, especially in height.

According to the present invention there is provided a sun roof for vehicles, comprising a main part slidable beneath the roof to open or close an aperture in the roof, and an upwardly tiltable front part for substantially preventing a direct entry of air from the front zone of the aperture, and in which the front part is disposed, in the closure position, substantially at the same height as the main part, characterised by the fact that it includes a single control cable for actuating the main part and the front part from the same side of the roof.

BRIEF DESCRIPTION OF THE DRAWINGS

For a better understanding of the present invention a particular embodiment is now described purely by way of non-limitative example with reference to the attached drawings, in which:

FIGS. 1, 2 and 3 are schematic views representing the sun roof of the present invention in three operating conditions;

FIGS. 5, 6 and 7 are sectional views respectively taken on the lines V—V, VI—VI and VII—VII of the sun roof of FIG. 1; and FIG. 8 is a partial sectioned view on an enlarged scale of a detail of the actuating device for the sun roof of the present invention.

DETAILED DESCRIPTION OF THE INVENTION

Figure 4:
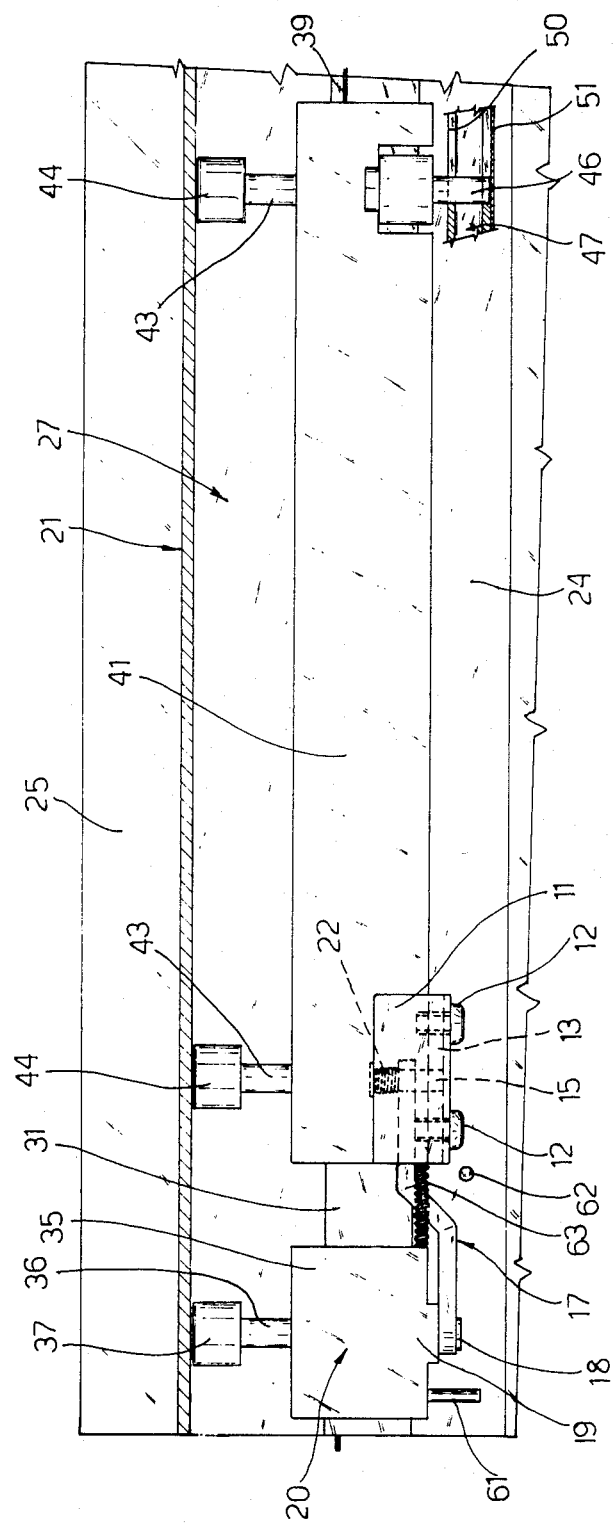
FIG. 4 is a partial schematic upper view of a portion of the actuating mechanism of the sun roof of the present invention.

With reference to FIG. 1, the reference numeral 1 indicates a sun roof, only partially shown, which allows an aperture 2 formed in a roof panel 3 of a motor vehicle body to be opened or closed. This sun roof 1 comprises a main part 4 of substantially rectangular form made of metal or plastics material of convenient transparency or glass, and a tiltable front part 5 made of the same material as the main part 4, or a different material, and of width equal to that of part 4 and a length of the order of about 10-15 cm. This front part 5, as can be seen better in FIG. 5, has secured to its underside a perimetral frame 6 which carries a perimetral seal 7 for the part 5, and moreover in the front part is connected by two hinges 8 to the roof panel 3. Around these hinges 8 are disposed in a known manner springs 9 which tend to urge the part 5 open, tilting it upwardly as is illustrated in FIGS. 2 and 3. As can be seen in FIG. 6, towards the rear side zones of the part 5 there is welded, to the underside of the frame 6, a respective mounting bracket 11 on which is fixed, by means of screws 12, a small plate 13 having a slot 14 open at the rear side of the part 5. This small plate 13 carries, between the screws 12, a pin 15 to which is connected one end 16 of a shaped link 17 which at the other end is connected by means of a pin 18 (FIG. 5) to a lateral portion 19 of an auxiliary carriage 20. The auxiliary carriage 20 is shaped to slide on a shaped guide section 21 which supports the various mechanisms of the sun roof 1 as will be described in more detail below. Around the pin 15 there is further wound a spring 22 which acts on the strut 17 to urge it towards the position spaced from the part 5 as is illustrated in FIGS. 2 and 3. The section 21, which is made for example of aluminum, is disposed in a conveniently inclined direction underlying the two sides of the aperture 2 and is moreover connected to a part, not visible, along the front side of the aperture 2 for housing manual or electric drive means of known type not illustrated. As is visible, for example, in FIGS. 5 to 7, this section 21 has, in cross section, a base 24 from which extends, on an outer side, a flange 25 which serves for connection to the roof panel 3, and also has two lateral guide cavities 26 and 27 for the slidable means which will be described in more detail below, and has a central portion 31 having two parallel through cavities 32 and 33. The auxiliary carriage 20 which has a main part resting on this portion 31, has on the side of its lateral portion 19 a shaped leg 34 which can slide in the cavity 32, whilst on the opposite side it has a lateral portion 35 to which is connected a leg 36 of a roller 37 which slides in the cavity 27 of the section 21. In the cavity 33 there is on the other hand inserted an actuating cable 39 to which is fixed a shaped lateral portion 40 of a main carriage 41 or control body having substantially the same section as the auxiliary carriage 20, and also slidable on the surface of the central portion 31 of the section 21, and having on the opposite side a shaped portion 42 which is housed in the cavity 32. On one side of the portion 40 there are connected two legs 43 for two rollers 44 which roll in the cavity 27 whilst on the side of the portion 42 there is located, towards the front zone of this side portion, a projection 45 which can be inserted into the slot 14 in the small plate 13 as can be seen in FIG. 1. Towards the rear zone of the main carriage 41 there is a laterally projecting peg 46 which is lodged in a shaped slot 47 having a first section 48 parallel to the base 24 of the section 21 and a convenient length as will be described in more detail below, and having a second section 49 inclined upwardly and extending from the end of the first section 48; this slot 47 is formed in a body 50 having a rectangular section which, as can be seen better in FIG. 7, is fixed laterally to a bracket 51 which is secured to the lower surface at the sides of the main part 4. Peg 46 and slot 47 from the so-called traction means. The sliding of peg 46 along slot 47 will be referred to herein as the play between these components. Around the perimeter of the part 4 this bracket 51 houses a seal 52. In the front zone of the body 50 there is a portion 53 to the side of which is connected a sliding block 54 which slides in the lateral cavity 26 of the profile 1 (FIG. 7) and which in the closure position of the main part 4 abuts against an element 55 fixed in this cavity 26. Along the front and rear edges of the main part 4 there is fixed a channel 56 of known type for collecting and conveying water, which at its end carries a seal 57 sealing against the front part 5.

The lateral portion 19 of the auxiliary carriage 20 has a projecting peg 61 which can cooperate with an abutment element 62 fixed on the base 24 of the section 21; moreover, this auxiliary carriage 20 carries a spring 63 fixed to the lateral portion 19 on the surface facing the main carriage 41.

The operation of the described sun roof of the present invention is as follows.

Starting from the position illustrated in FIG. 1 in which the sun roof 1 is completely closed, manual or motorised control operation of the actuating device makes the actuating cable 39 slide towards the right on the side illustrated, which causes a corresponding displacement to the right of the main carriage 41 (FIG. 2). In these conditions there is a first separation of the projection 45 from the slot 14 so that it disengages from the front part 5 which, under the action of the spring 9 of the hinge 8, starts to rise. With the progressive displacement towards the right of the main carriage 41, sliding of the peg 46 in the first section 48 of the slot 47 takes place, which does not cause any displacement of the main part 4. At the same time displacement of main carriage 41 to the right allows the auxiliary carriage 20, which is secured to the small plate 13 rigidly connected to the front part 5 by means of the link 17, to move to the right as the front part is urged upwardly by the spring 22. The sliding of this auxiliary carriage 20 stops when the peg 61 blocks the element 62, and in this position, in which the front part 5 reaches the maximum upward inclination, the peg 46 is located at the rear end of the first section 48 of the slot 47. Subsequent displacement of the actuating cable 39 and therefore of the main carriage 41 towards the right (FIG. 3) causes the peg 46 to be displaced along the second section 49 of the slot 47 and this causes a lowering of the main part 4, which therefore can be made to enter under the roof panel 3.

The operations for closure of the sun roof 1 take place in a reverse manner from that described; in particular, displacement towards the left of the actuating cable 39 and the main carriage 41 connected to it causes the main part 4 to be drawn out progressively from under the roof panel 3 until the slide block 54 of the body 50 reaches the abutment element 55; at this point (FIG. 3) sliding of the peg 46 in the slot 47 starts so that there is a raising of the main part 4 to dispose it in the closure position, and then advancement towards the left of the main carriage 41 which, by means of the spring 63, acts on the auxiliary carriage 20 and causes progressive leftward displacement thereof such that the link 17 controls progressive lowering of the front part 5 until it is positioned at the same height as the main part 4 (FIG. 1) and in this position the projection 45 of the main carriage 41 is inserted into the slot 14 of the small plate 13, which causes a secure positioning of the front part 5 in the closure position.

The advantages obtained with the described sun roof of the present invention are apparent from what has been explained. In fact, the actuation both of the main part 4 and of the front part 5 of the sun roof 1 is obtained with a single actuating cable 39 from either side of the roof 1 itself, thus obtaining a relatively simple structure with a mechanism which is not complicated or bulky and which therefore allows a relatively small height of the sun roof 1 to be maintained. Moreover, there is the advantage of obtaining automatic and secure closure of the front part 5. The formation of the guide and support structure with the section 21 is also economically advantageous in that the fixing to the roof panel 3 simplifies the assembly operations and the sun roof 1 can be made completely separately and mounted on the vehicle only as a final fitting operation.

Finally, it is clear that the described embodiments of the present invention can be modified and varied both as to form and disposition of the various parts, without departing from the scope of the invention itself.

I claim:

1. A sun roof for vehicles, comprising a main part slidable beneath a roof between first and second positions to respectively close and open a first portion of an aperture in said roof, a front part rotatable between first and second positions to respectively close a second portion of said aperture and substantially prevent direct entry of air in the second portion of said aperture, and first means operable to initially rotate said front part between said respective first and second positions and subsequently displace said main part between said respective first and second positions, wherein said front part and said main part are disposed at substantially the same height when said front part and said main part are in said respective first positions, and said front part is inclined upwardly relative to said main part when said front part is in said second position, said first means including a first control cable arranged at a first lateral side of the sun roof, a movable control body which controls the positions of said main part and said front part, and a movable auxiliary body having means for engaging said control body, said cable being engaged to said movable control body, and said front part being coupled to first resilient means which urge said front part towards said second position and being thrust into said first position by linking means connected to said auxiliary body during forward movement of said auxiliary body toward the front of said sun roof, said forward movement of said auxiliary body being driven by forward movement of said control body, said main part remaining stationary during movement of said front part between said first and second positions.

2. The sun roof according to claim 1, wherein said linking means comprise at least one linking element pivoted between said front part and said auxiliary body and a second resilient means operable to act on said linking element to urge said front part toward said second position.

3. The sun roof according to claim 1, further comprising abutment means for stopping the sliding of said auxiliary body when said front part reaches said second position.

4. The sun roof according to claim 1, further comprising additional resilient means interposed between said control body and said auxiliary body.

5. The sun roof according to claim 1, wherein said control body and said auxiliary body slide on a single rail.

6. The sun roof according to claim 1, wherein said first means further comprises associated traction means arranged between said control body to which said control cable is fixed and a body fixed to said main part, said associated traction means having play between components thereof.

7. The sun roof according to claim 6, wherein said traction means comprise a projecting element connected to the control body and disposed in a slot formed in said body connected to said main part, said slot having a first portion of length equal to the amount of said play, and an inclined portion communicating with said first portion, said inclined portion causing a lowering of said main part in the course of rearward movement of said control body.

8. The sun roof according to claim 6, further comprising an abutment element for blocking said body fixed to said main part when said main part reaches said first position.

9. The sun roof according to claim 1, further comprising engagement means for locking said front part in said first position.

10. The sun roof according to claim 9, wherein said engagement means comprises a first engagement element mounted on said front part and a second engagement element mounted on said control body.

11. The sun roof according to claim 10, wherein said first engagement element comprises a body having a cavity and said second engagement element comprises a projection connected to said control body and capable of engaging said cavity.

* * * * *